(12) United States Patent
Alfakhrany et al.

(10) Patent No.: US 9,664,399 B2
(45) Date of Patent: May 30, 2017

(54) VENTILATOR AND BLADE THEREFOR

(71) Applicant: CSR Building Products Limited, North Ryde, New South Wales (AU)

(72) Inventors: Tarek Alfakhrany, Melrose Park (AU); Colin Schwecke, Westleigh (AU); Derek Munn, Roseville Chase (AU)

(73) Assignee: CSR BUILDING PRODUCTS LIMITED, North Ryde, New South Wales (AU)

( * ) Notice: Subject to any disclaimer, the term of this patent is extended or adjusted under 35 U.S.C. 154(b) by 0 days.

(21) Appl. No.: 14/426,729

(22) PCT Filed: Sep. 9, 2013

(86) PCT No.: PCT/AU2013/001020
§ 371 (c)(1),
(2) Date: Mar. 6, 2015

(87) PCT Pub. No.: WO2014/036611
PCT Pub. Date: Mar. 13, 2014

(65) Prior Publication Data
US 2015/0226442 A1    Aug. 13, 2015

(30) Foreign Application Priority Data

Sep. 7, 2012   (AU) ................................ 2012903918

(51) Int. Cl.
*E21F 1/08*   (2006.01)
*F03B 3/12*   (2006.01)
(Continued)

(52) U.S. Cl.
CPC ............... *F24F 7/025* (2013.01); *E21F 1/08* (2013.01); *F03B 3/121* (2013.01); *F03D 1/06* (2013.01);
(Continued)

(58) Field of Classification Search
None
See application file for complete search history.

(56) References Cited

U.S. PATENT DOCUMENTS 1,702,120 A * 2/1929 Kimball .................. F23L 17/10
454/19
1,773,453 A * 8/1930 Flettner ................... F23L 17/10
454/117
(Continued)

FOREIGN PATENT DOCUMENTS

AU          654141        3/1992
AU          8175591       3/1992
(Continued)

OTHER PUBLICATIONS

International Search Report for PCT/AU2013/001020 dated Sep. 26, 2013 (3 pages).
(Continued)

*Primary Examiner* — Gregory Huson
*Assistant Examiner* — Eric Gorman
(74) *Attorney, Agent, or Firm* — Michael Best & Friedrich LLP

(57) ABSTRACT

A roof-mounted ventilator comprising a plurality of blades is disclosed. Each blade comprises front and back blade faces and leading and trailing edges. When the ventilator is viewed in side profile, the blades are positioned and configured such that a line of sight into the interior of the ventilator is substantially restricted or obstructed. Restricting or obstructing the line of sight into the ventilator can reduce or prevent various particles, such as water droplets, debris, dust and light, from entering the ventilator interior. For example, rain is thereby forced to strike a face of the blades, thus preventing direct access into the ventilator interior. The blade itself may include additional features, such as a lip that extends along the length of the leading (Continued)

edge, to further prevent particles from entering the ventilator interior, or to redirect the particles away from the ventilator interior in a controlled manner.

32 Claims, 7 Drawing Sheets

(51) Int. Cl.
| | |
|---|---|
| F03D 1/06 | (2006.01) |
| F03D 9/00 | (2016.01) |
| F24F 5/00 | (2006.01) |
| F24F 7/02 | (2006.01) |
| F24F 13/20 | (2006.01) |
| F24F 11/00 | (2006.01) |
| F24F 13/00 | (2006.01) |
| F03D 3/06 | (2006.01) |
| F04D 25/08 | (2006.01) |
| F04D 25/12 | (2006.01) |
| F04D 29/28 | (2006.01) |
| F04D 29/30 | (2006.01) |

(52) U.S. Cl.
CPC .............. *F03D 3/065* (2013.01); *F03D 9/00* (2013.01); *F04D 25/08* (2013.01); *F04D 25/12* (2013.01); *F04D 29/282* (2013.01); *F04D 29/30* (2013.01); *F24F 7/02* (2013.01); *F24F 13/20* (2013.01); *F05B 2240/215* (2013.01); *F05B 2240/9112* (2013.01); *F05D 2240/303* (2013.01); *F24F 5/0046* (2013.01); *F24F 2221/52* (2013.01); *Y02B 10/30* (2013.01); *Y02E 10/721* (2013.01); *Y02E 10/728* (2013.01); *Y02E 10/74* (2013.01)

(56) References Cited

U.S. PATENT DOCUMENTS

| | | | | |
|---|---|---|---|---|
| 1,965,171 | A * | 7/1934 | Boyer | F04D 25/022 454/16 |
| 1,977,934 | A * | 10/1934 | Bolton | F23L 17/10 454/18 |
| 2,469,096 | A * | 5/1949 | Wilson | F23L 17/10 454/18 |
| 2,672,087 | A * | 3/1954 | Marr | F24F 13/06 454/308 |
| 2,824,507 | A * | 2/1958 | Alldritt | F24F 7/025 454/356 |
| 3,101,662 | A * | 8/1963 | Alldritt | F24F 7/025 416/242 |
| 3,102,679 | A * | 9/1963 | Rudy | F04D 17/165 415/207 |
| 3,202,080 | A * | 8/1965 | Cook | F24F 7/025 415/211.2 |
| 3,220,457 | A * | 11/1965 | Bailey | F23D 11/04 239/222 |
| 3,368,744 | A * | 2/1968 | Jenn | F04D 29/282 29/889.4 |
| 3,433,145 | A * | 3/1969 | Daly et al. | F04D 25/14 348/E11.011 |
| 4,303,375 | A | 12/1981 | Foglesong et al. | |
| 4,416,415 | A * | 11/1983 | Kolt | F23L 17/10 236/49.5 |
| 4,501,389 | A * | 2/1985 | Kolt | F23L 17/10 236/49.5 |
| 4,641,571 | A * | 2/1987 | Anderson | F24F 7/025 454/19 |
| 4,648,312 | A * | 3/1987 | Schad | F23L 17/10 416/227 A |
| 4,697,736 | A * | 10/1987 | Kolt | F24F 11/053 236/49.5 |
| 4,759,272 | A * | 7/1988 | Zaniewski | F23L 17/005 110/162 |
| 5,910,045 | A * | 6/1999 | Aoki | F04D 17/02 454/186 |
| 6,302,778 | B1 | 10/2001 | Andrews et al. | |
| 6,352,473 | B1 * | 3/2002 | Clark | F23L 17/10 454/18 |
| 2004/0219019 | A1 * | 11/2004 | Taylor | F03D 3/0409 416/132 B |
| 2007/0137243 | A1 * | 6/2007 | Lee | F04D 29/462 62/419 |
| 2008/0200113 | A1 * | 8/2008 | Munn | F03D 3/005 454/341 |
| 2011/0211963 | A1 * | 9/2011 | Bohl | F04D 29/162 416/179 |
| 2012/0038162 | A1 * | 2/2012 | Smith, Jr. | F03D 9/002 290/52 |
| 2013/0040553 | A1 * | 2/2013 | Potter | F24F 7/025 454/341 |
| 2014/0020313 | A1 * | 1/2014 | Preston, III | E04D 13/17 52/199 |
| 2014/0120818 | A1 * | 5/2014 | Bennett | F24F 7/025 454/16 |
| 2014/0369826 | A1 * | 12/2014 | Rohring | F03D 1/04 415/207 |

FOREIGN PATENT DOCUMENTS

| | | |
|---|---|---|
| CN | 102466311 A | 5/1992 |
| JP | 10246502 A | 9/1998 |
| WO | 02065023 | 8/2002 |
| WO | 2007131379 | 11/2007 |
| WO | 2011/013105 A2 | 2/2011 |

OTHER PUBLICATIONS

International Search Report and Written Opinion for AU2012903918 dated Dec. 4, 2012 (8 pages).
International Preliminary Report on Patentability for PCT/AU2013/001020 dated Sep. 26, 2013 (5 pages).
European Search Report for Application No. 13834762.0 dated Jul. 20, 2016 (7 pages).
New Zealand Examination Report for Application No. 705405 dated Sep. 23, 2016 (4 pages).

\* cited by examiner

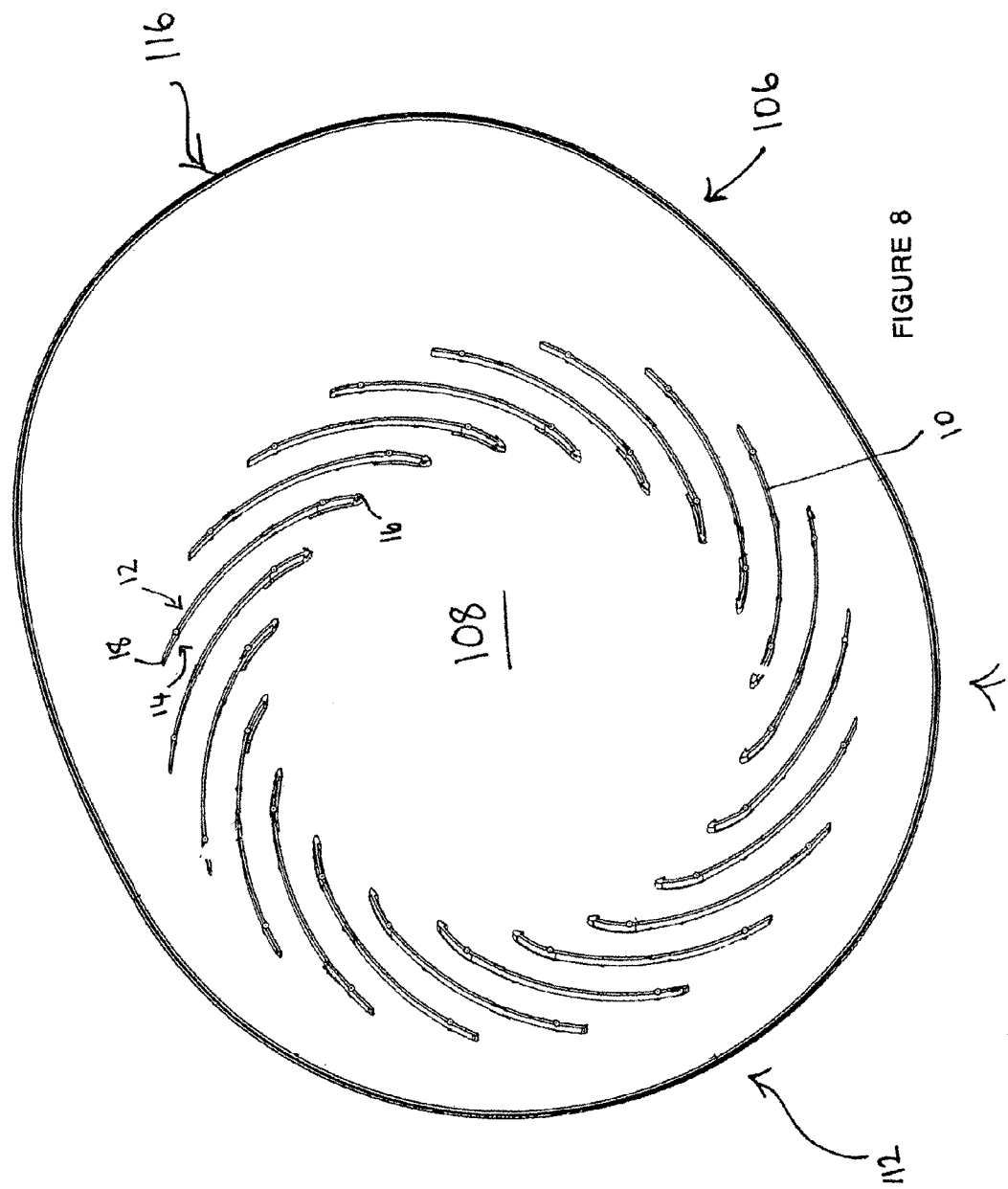

VENTILATOR AND BLADE THEREFOR

TECHNICAL FIELD

A ventilator and a ventilator blade are disclosed. The ventilator and ventilator blade may find particular application in roof-mounted ventilators, although they can be employed in other ventilator types, such as wall-mounted ventilators.

BACKGROUND ART

Ventilators can be employed to evacuate air and other gases from enclosed spaces. Such enclosed spaces can include the roof space or interior of commercial and domestic buildings, shipping containers, portable buildings and sheds, automobiles etc. The air and other gases evacuated can include warm or heated gases, moist gases, gas containing contaminants such as contaminated air or toxic fumes, stale gases (especially air), etc.

Various types of wind and/or motor-driven rotor ventilators, such as those disclosed in AU 654141 or U.S. Pat. No. 6,302,778, are known. Static ventilators (i.e. the provision of a vent) are also known. Problems specific to ventilators that are mounted outside a structure are that they are exposed to all of the elements, such as wind, rain, snow, etc. As ventilators are generally used to vent an enclosed space, they must be able to prevent such elements from entering the enclosed space. Usually, covers or cowls have been required to prevent the elements from entering into the structure through the ventilator. In the case of wind, or wind and motor- (e.g. hybrid), driven ventilators, these covers or cowls have been associated with reducing the air flow, and thus the efficiency, of the ventilator. The covers or cowls screen at least a part of the blades, thereby reducing the area of the blades exposed to the wind, and thus reducing the overall flow of air achievable.

The above references to the background art do not constitute an admission that the art forms a part of the common general knowledge of a person of ordinary skill in the art. The above references are also not intended to limit the application of the ventilator or ventilator blade as disclosed herein.

SUMMARY

Disclosed herein, in a first aspect, is a roof-mounted ventilator. A typical structure to which the ventilator may be mounted is a roof, or wall etc, of an enclosed space of a building, or portable structure such as a shed, house, automobile, etc. It should be appreciated, however, that the ventilator may be mounted to another structure, or part thereof.

The ventilator comprises a plurality of blades. Each blade comprises front and back blade faces. Each blade also comprises leading and trailing edges. The leading edge is the edge of the blade, when mounted in a ventilator, which is located in the inner part of the ventilator and by which the air, gas or other fluid first passes when extracted by the ventilator. The trailing edge is the edge which is located at the outer portion of the ventilator and is the part by which the air, gas or other fluid that is extracted, exits the ventilator. It should also be understood that the trailing edge is that part of the blade which is directly and first contacted by the wind, when the ventilator is of the natural or hybrid type.

In accordance with the present disclosure, when the ventilator is viewed in side profile, the blades are positioned and configured such that a line of sight into the interior of the ventilator is substantially restricted or obstructed.

Restricting or obstructing the line of sight into the ventilator can reduce or prevent various particles from entering the interior of the ventilator. Such particles may include water droplets, debris, dust and light. As there is no direct line of sight between adjacent blades, rain and the like is forced to strike a face of one or more of the blades, thus preventing direct access into the interior of the ventilator. Similarly, irritating flickering of light can be reduced or prevented, as light cannot pass directly into the interior of the ventilator, as is possible with ventilators having line of sight gaps between the rotating blades. This has been particularly problematic in applications where the ventilator has been mounted either directly onto inhabited spaces, or ducted to them.

It should be understood that a reference herein to "blades" is not intended to exclude a rotor of the ventilator being rotated by means other than wind or a motor. For example, the rotor may be driven by thermally generated gas currents exiting an enclosed space via the ventilator, or as a result of other gas pressurising means operating within the enclosed space (e.g. conditioned or heat-induced airflow). Further, the blades may take the form of a vane, or another wind drivable element, such as a cup, sail-shape etc. The term "blades" should thus be interpreted broadly.

Further, whilst the ventilator blade will be described with reference to its employment in a roof-mounted ventilator, it should be appreciated that the blade may be used in other ventilators. Also, whilst various facets of the ventilator blade will be referred to when it is employed in a roof-mounted ventilator, it should be appreciated that this is merely to assist with the understanding of the present disclosure.

In one form, the blades may be positioned such that, when the ventilator is viewed in a sectional plan view and a line is taken extending between the leading and trailing edges of a blade, the line is unable to extend uninterruptedly into an interior of the ventilator. The line may intersect with the front blade face of an adjacent blade. As mentioned above, this configuration can prevent particles, such as rain, debris, dust, ambient light, etc, from directly entering the ventilator, as the particles are not able to pass directly through the spacing between adjacent blades. The particles will be forced to strike one of the faces of the various blades, before entering the ventilator.

In one form, the blades may be positioned such that, when viewed in side profile, each blade substantially overlaps with an adjacent blade. This can further minimise the ability of particles to enter into the interior of the ventilator. Some known ventilators, such as those disclosed in AU 654141 or U.S. Pat. No. 6,302,778, have adjacent blades that overlap to some extent. However, the blades of AU 654141 and U.S. Pat. No. 6,302,778 do not overlap to the extent that a line of sight into the interior of the ventilator is substantially restricted or obstructed. Thus, the ventilators of AU 654141 and U.S. Pat. No. 6,302,778 may not adequately prevent the ingress of particles into the interior of the ventilator.

In one form, the blade leading edge may comprise a first lip extending along its length on the back blade face. When wind contacts the ventilator, particles, such as dust, debris and water, which contact the trailing edge of the blade will generally follow the curvature of the back face. Whilst centrifugal forces assist in redirecting some of the particles to the exterior of the ventilator, some will move past the leading edge of the back blade face and into the interior of the ventilator. This can lead to the dust, debris and/or water either entering into the space being ventilated, or interfering with rotary or electrical components of the ventilator, thus reducing its lifespan.

The first lip on the leading edge of the back blade face may provide a surface to obstruct the normal flow of particles, which may have contacted and travelled along the back blade face, from entering the ventilator. This can prevent or reduce the number of particles directly entering the interior of the ventilator in an uncontrolled manner. In this context, "uncontrolled manner" describes the way in which the particles can enter the ventilator at any point along the height of the blade leading edge. The first lip may be used to redirect the particles to a specific part of the ventilator interior (i.e. below the first lip, in a controlled manner), which can minimise damage to rotary parts or prevent their entrance into the space being ventilated.

In one form, a channel, or groove, may be formed between the first lip and the back blade face. In this regard, the first lip may extend such that an acute angle is formed between the first lip and the back blade face. This channel can further assist with the collection and redirection of particles that strike the back blade face. The channel can also increase the number of particles which are able to be collected at the lip before the particles begin to flow past an outer edge of the lip.

The first lip may further extend along a portion of an underside edge of the back blade face. This can assist directing in the particles to a position in the ventilator where the least damage can be caused. For example, the lip may extend along the underside edge for about a quarter of the length of the blade, allowing particles to be directed away from a centrally mounted motor or bearings.

Whilst, in one form, the first lip may be a separate component attachable to the blade, in another form, the first lip may be integrally formed with the blade. This can further minimise potential points through which the particles may enter the interior of the ventilator.

In one form, the blade leading edge may further comprise a second lip, extending along its length on the front blade face. Whilst wind that contacts the ventilator will mostly impinge on the back blade face, particles may still enter the ventilator interior on this side of the blade (for example, when there is minimal rotation of the blades). Providing the leading edge with a second lip that extends on its front blade face can further assist in the reduction or elimination of particles entering the interior of the ventilator in an uncontrolled manner. The second lip may, in a manner similar to the first lip, provide a surface to obstruct the normal flow of particles, which may have contacted and travelled along the front blade face, from entering the ventilator.

In one form, a channel may be formed between the second lip and the front blade face. The second lip may also extend such that an acute angle is formed between the second lip and the front blade face, similar to the first lip. This channel can also assist with the collection and redirection of particles that strike the front blade face. The channel can also increase the number of particles which are able to be collected at the lip before the particles begin to flow past an outer edge of the lip.

The second lip may also extend along a portion of an underside edge of the front blade face, again to redirect the particles to a specific location in the ventilator. The first and second lips may extend different distances along the back and front blade faces, respectively. For example, the first lip may generally collect more particles than the second lip. It may therefore be preferential to have the greater volume of particles collecting at the first lip to be directed to a different part of the ventilator than the smaller volume of particles collecting at the second lip. Generally, and as will be discussed in further detail below, the first and second lips may extend the same distance along the back and front blade faces, respectively. This allows all of the particles to be directed to a single region in the interior of the ventilator.

In one form, the second lip may be narrower than the first lip. As the front blade face is generally under higher pressures than the back blade face, and due to the direction that wind impinges on the blade, particles are less likely to congregate at the front blade face, and will generally be removed therefrom to the exterior of the ventilator by centrifugal forces. To reduce drag associated with the second lip, and the amount of material required to produce the blade with the second lip (and thus weight), it can therefore be produced narrower than the first lip, whilst still ensuring adequate redirection of particles.

Whilst, in one form, the second lip may be a separate component attachable to the blade, in another form, the second lip may be integrally formed with the blade. This can further minimise potential points through which the particles may enter the interior of the ventilator.

In one form, the first and second Lips may extend so as to form the leading edge as an aerodynamic edge. This can reduce the amount of drag and exhaust air flow restriction caused by the first and second lips.

The trailing edge may comprise an aerodynamic profile at the front blade face. This can further reduce drag caused by the presently disclosed blade.

In one form, the ventilator may further comprise an internal drainage line that substantially aligns with a lower end of the or each lip on the blades. This can allow particles that have been redirected by the lip to be funnelled by the internal drainage line, to ensure that the particles do not contact various internal components of the ventilator, such as the motor or rotating parts. It can also prevent particles from entering the space being ventilated, or the ducting to which the ventilator is attached.

In one form, the internal drainage line may extend to an external portion of the ventilator. This can allow any particles to be removed from the interior of the ventilator to the exterior thereof. This can also prevent a build-up of particles in the internal drainage line, or at various other points in the interior of the ventilator.

In one form, one or more of the blades may be substantially exposed to the wind in use, and the ventilator may be of the wind-driven type. More typically each blade is arranged in use to be substantially exposed to the wind. Thus, the ventilator rotor may function in a normal wind-driven manner to receive a maximum prevailing wind force. Alternatively, the ventilator may be motor driven, or may be a combination of wind- and motor-driven (such as a so-called "hybrid" ventilator).

In one form, the ventilator may further comprise a cover positioned over the blades. The cover may further protect the ventilator from environmental conditions/elements, may increase the rigidity of the ventilator, may provide an aerodynamic profile to the ventilator, and/or may enhance the aesthetics of the ventilator.

The cover may take the form of a traditional dome-shaped cover, mounted to a part of the ventilator stator. Alternatively, the cover may comprise a central portion surrounded by an outer substantially concave portion. A cover having an outer concave portion may also assist in the redirection of particles away from the interior of the ventilator. The outer concave portion can act as a trough, from which the particles can then be directed off the cover. The trough can also act to prevent the particles from escaping over the sides of the cover, and into the ventilator.

In one form, the central portion may be substantially convex. The central convex portion can also help direct particles into the outer concave portion, preventing accumulation of particles at the centre of the cover.

In one form, the cover may be asymmetrical such that it extends further beyond the ventilator blades on one side of the ventilator. The cover projecting beyond the ventilator on one side can assist in preventing rain from entering the ventilator. This may be particularly useful when the ventilator is mounted such that the blades (i.e. a rotor of the ventilator) are substantially parallel to the roofline. The cover can be mounted, such that it extends beyond the ventilator on the high-side of the roof. Such a configuration provides similar protection from particles, such as rain, whilst reducing the overall size of the cover.

In one form, the cover may further comprise a spout. Such a spout may be formed by part of the outer substantially concave portion of the cover converging at a periphery of the cover. The spout may preferably be located on the lower side of the roof-line in use (i.e. on an opposite side of the cover to the extending portion). The spout may be used to direct particles, such as water droplets from rain, which have contacted the cover to be directed off the cover and away from the ventilator. The combination of the trough, formed by the substantially concave portion, and the spout provides sufficient velocity to direct water off the cover, without it trickling into the interior of the ventilator.

In one form, the ventilator may further comprise one or more mounts for mounting the cover to a stator of the ventilator. These mounts can also act as a guide to direct particles, such as water, down the mounts, away from the interior of the ventilator. A stator of the ventilator may further comprise a peripheral skirt that extends around the ventilator. The skirt may be angled slightly downwardly, in use. This can prevent particles that are reflected off the roof from entering the interior of the ventilator. The mounts may be positioned to extend from the peripheral skirt.

When the ventilator comprises a cover having a spout, the spout may be substantially aligned with one of the mounts. Having the spout aligned with a mount can further direct any water which has insufficient velocity to be propelled off and away from the cover, to be guided down the mount and away from the interior of the ventilator.

A ventilator, in the form of a rotor ventilator (such as a natural or hybrid ventilator) as disclosed herein, may be mounted to a roof, such that a rotor of the ventilator is generally aligned with the pitch of the roof. As wind or air currents flow over a roof, the airflow will generally be parallel to the roof line. The blades of the rotor are therefore able to function more efficiently, as the airflow will strike the blade more directly than in known natural or hybrid ventilators, which are required to be mounted such that their rotors are substantially parallel to the ground.

A ventilator blade is also disclosed herein. The ventilator blade finds particular application in roof-mounted ventilators, though can be employed in other ventilators. The blade comprises front and back blade faces. The blade also comprises leading and trailing edges.

As set forth above, the leading edge is the edge of the blade, when mounted in a ventilator, which is located in the inner part of the ventilator and through which the air, gas or other fluid first passes when extracted by the ventilator. The trailing edge is the edge which is located at the outer portion of the ventilator and is the part through which the air, gas or other fluid that is extracted, exits the ventilator. It should also be understood that the trailing edge is that part of the blade which is directly contacted by the wind when the ventilator is a natural or hybrid (combination of wind and powered) ventilator.

In accordance with the present disclosure, the leading edge comprises a first lip extending along its length on the back blade face. The blade may be otherwise as defined above in the first aspect.

BRIEF DESCRIPTION OF THE DRAWINGS

Notwithstanding any other forms that may fall within the scope of the ventilator and ventilator blade as set forth in the Summary, specific embodiments of the ventilator and ventilator blade will now be described, by way of example only, with reference to the accompanying drawings in which:

FIG. 8 shows a schematic view of a cover embodiment that overlies the arrangement of the ventilator blades shown in FIG. 3.

DETAILED DESCRIPTION OF SPECIFIC EMBODIMENTS

Figures 1A, 1B:
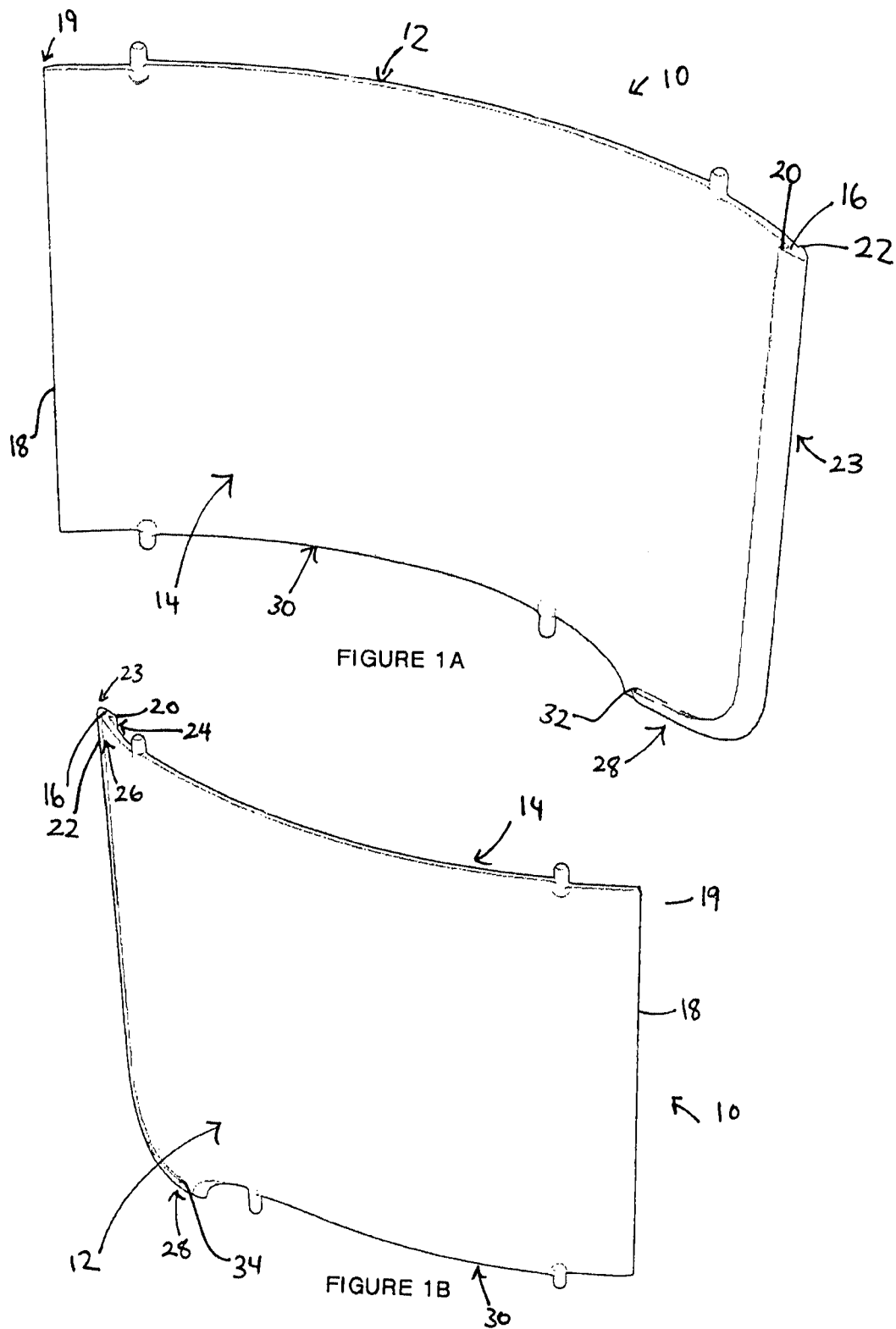
FIGS. 1A and 1B show back and front perspective views, respectively of a ventilator blade embodiment.

In the drawings, FIG. 1 shows an embodiment of a ventilator blade 10. The blade 10 finds particular application in roof-mounted ventilators, such as the ventilator 100 shown in FIGS. 2, 4, 5 and 7, though can be employed in other ventilators. The blade 10 comprises a front blade face 12 and a back blade face 14.

The blade 10 also comprises a leading edge 16, which is located in the interior of the ventilator 100, and a trailing edge 18 which is located at the outer portion of the ventilator 100 and is directly contacted by the wind, etc. The trailing edge 18 is shown having an aerodynamic profile 19. In the embodiment shown, the leading edge 16 comprises first and second lips 20, 22, respectively, extending along its length on the back and front blade faces 14, 12, respectively. The first and second lips extend to form the leading edge with an aerodynamic profile 23. Whilst this embodiment shows the leading edge 16 of the blade 10 having two such lips 20, 22, the blade may only have one such lip 20. It is preferable where only one such lip 20 is employed, that the lip be positioned on the back blade face, as more water is likely to enter the ventilator on this blade side. Further, whilst this embodiment shows the second lip 22 as being narrower than the first lip 20, the lips may be of comparable dimensions.

Figure 6:
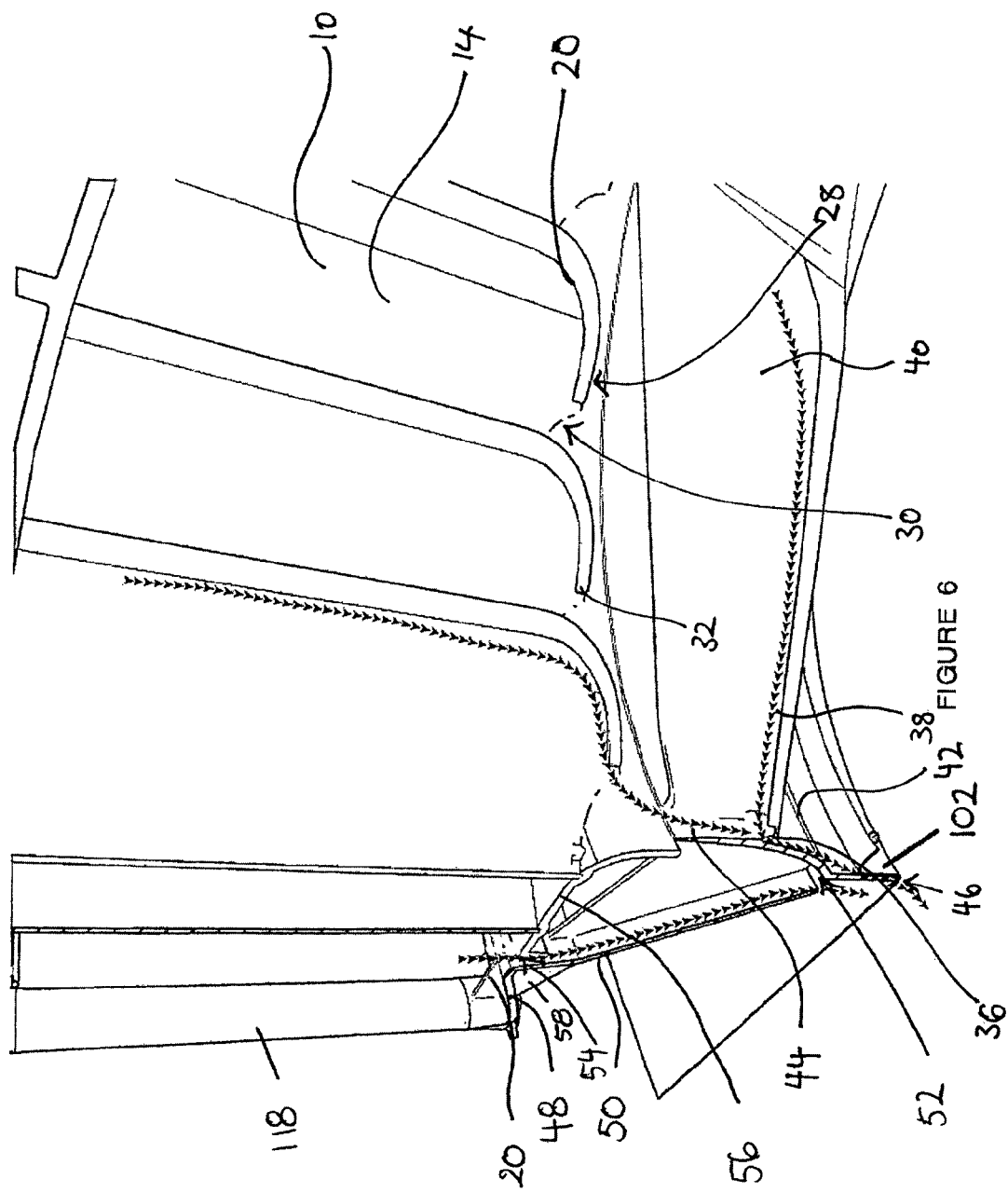
FIG. 6 shows a partial internal view of the ventilator embodiment of FIGS. 2 to 5.

The lips 20, 22 are shown in FIG. 1 as being integrally formed with the blade 10 and forming a channel 24, 26, or groove, between the respective lips 20, 22 and the respective back and front blade faces 14, 12. The lips 20, 22 provide a surface to obstruct the normal flow of particles, such as droplets of water. The channels 24, 26 are used to control and direct the flow of the water and prevent it from entering the interior of the ventilator 100 in an uncontrolled manner. The lips 20, 22 may be used to redirect the particles to a specific part of the ventilator 100 interior, as shown in FIG. 6.

The lips 20, 22 are also shown extending the same distance along a portion 28 of an underside edge 30 of the blade 10. Whilst not shown, the ends 32, 34 of the lips 20, 22 may be shaped to streamline the flow of water off the blade 10. FIG. 6 shows the flow path of the water travelling down lips 20, 22 and being directed past the ends 32, 34 of lips 20, 22. The ends 32, 34 of lips 20, 22 are approximately aligned with a drainage channel 36. A similar drainage channel 38 may be provided along each of the stator arms 40. The drainage channels 36, 38 are designed to direct the water to flow down the inner wall 44 of base 42. Base 42 mounts the ventilator 100 to flashing 102, with the flashing mounting to the roof 200. When the base 42 is mounted to the flashing 102, a narrow gap 46 is maintained therebetween (e.g. by spacers), to allow the water to drain from the interior of ventilator 100 to the exterior of the ventilator.

Figure 2:
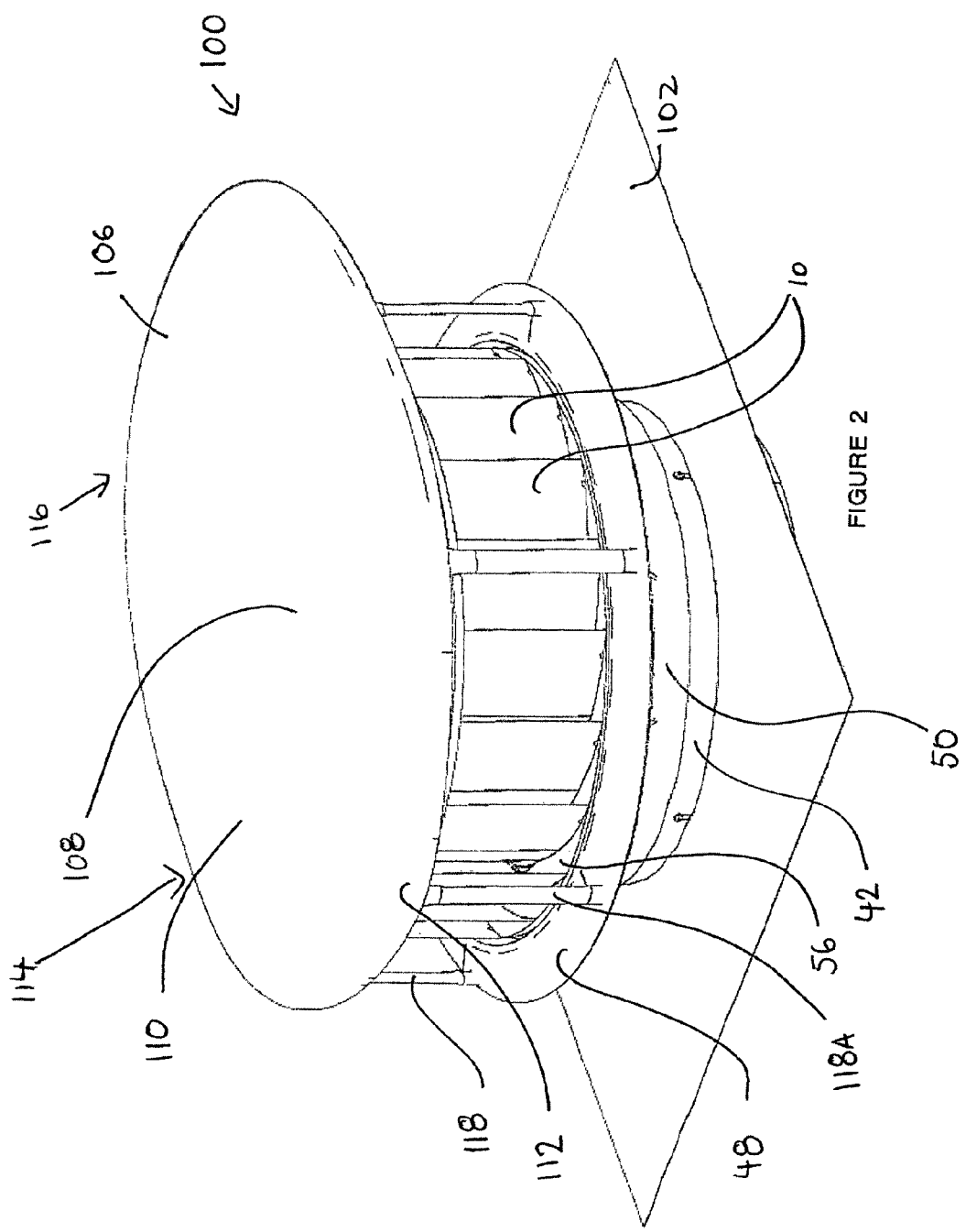
FIG. 2 shows a perspective view of a ventilator embodiment.
Figure 7:
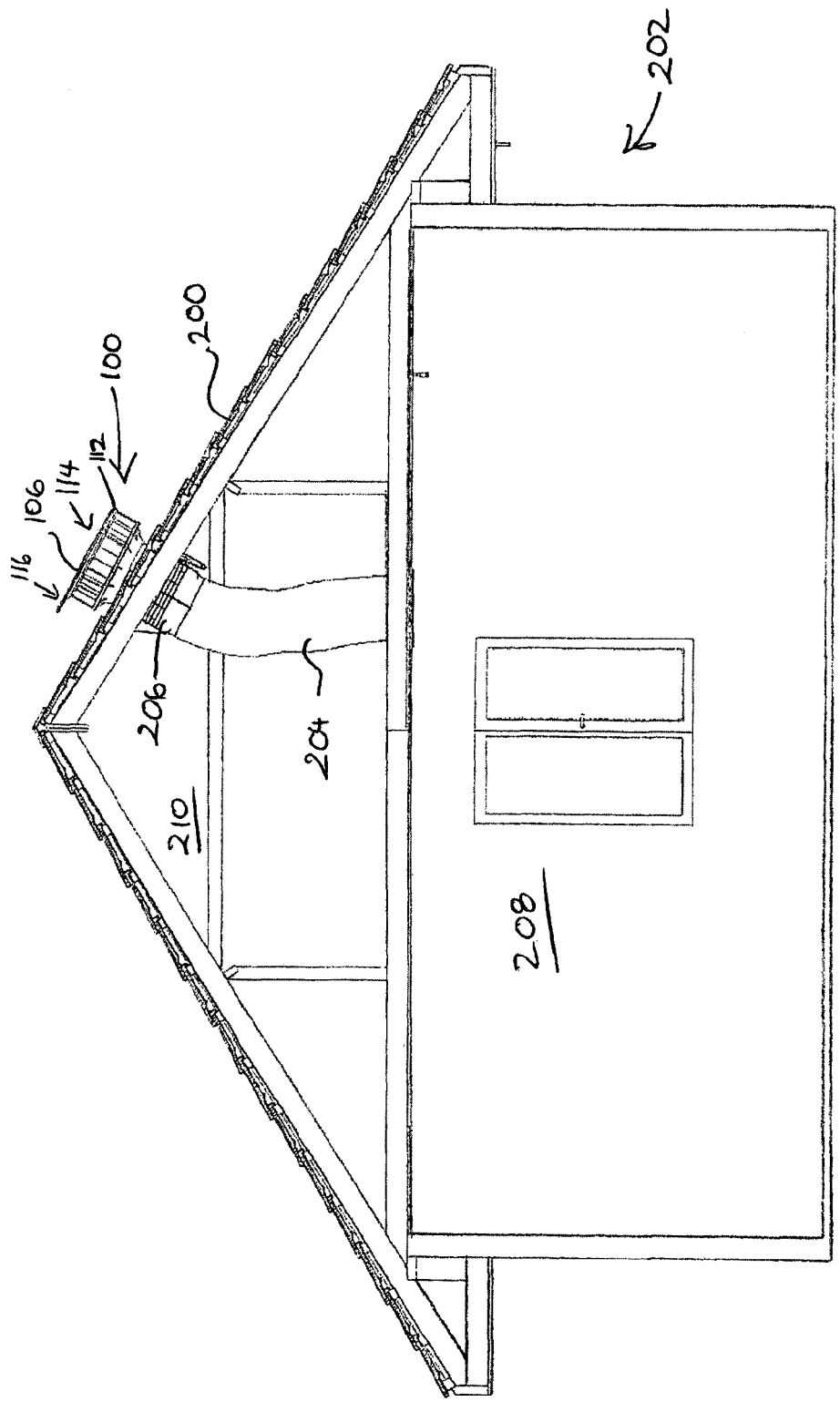
FIG. 7 shows a schematic view of a house incorporating the ventilator embodiment of FIGS. 2 to 6.

Referring now to FIG. 2, a perspective view of ventilator 100 is shown mounted to flashing 102, and FIG. 7 shows a schematic view of ventilator 100 mounted to the roof 200 of house 202. The blades 10 of the ventilator are positioned and configured such that a line of sight into the interior of the ventilator 100 is substantially restricted or obstructed, when viewed in side profile (best shown in FIGS. 4 and 5).

Figure 3:
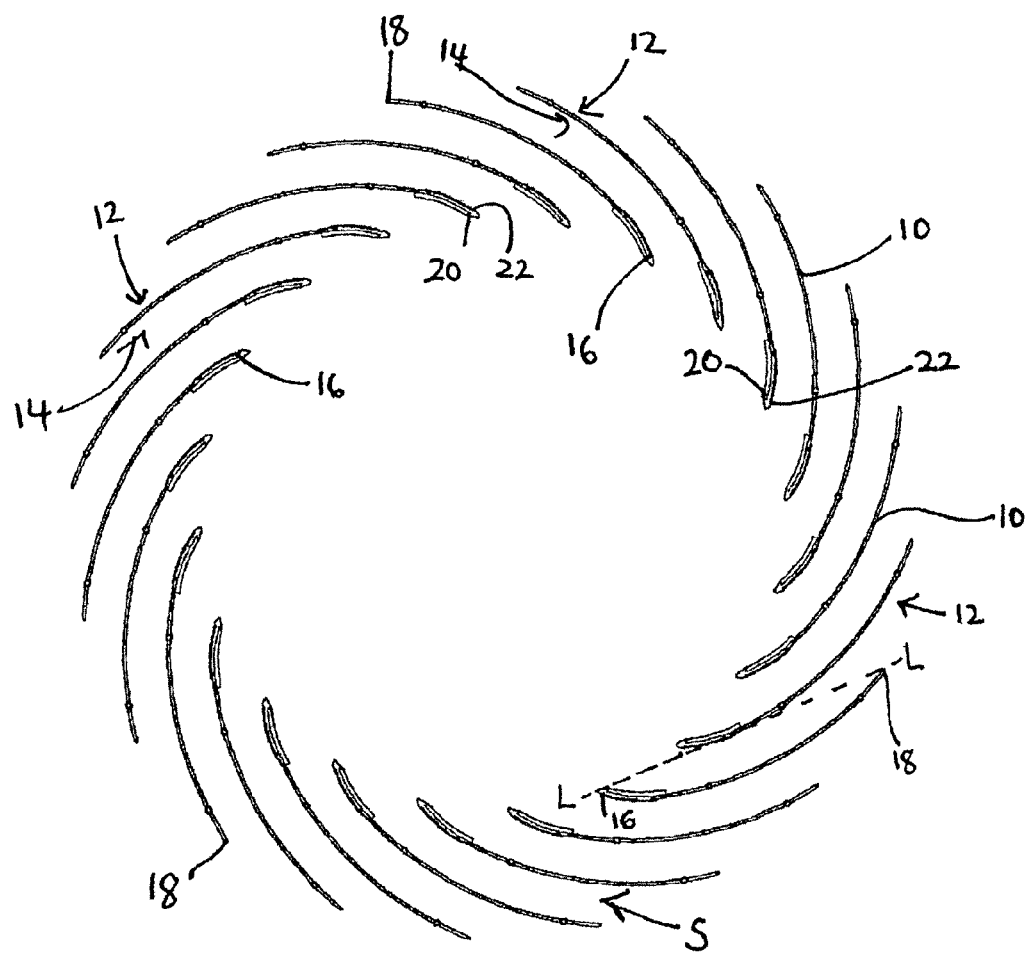
FIG. 3 shows a plan view of the arrangement of the ventilator blades shown in the ventilator embodiment of FIG. 2.
Figure 4:
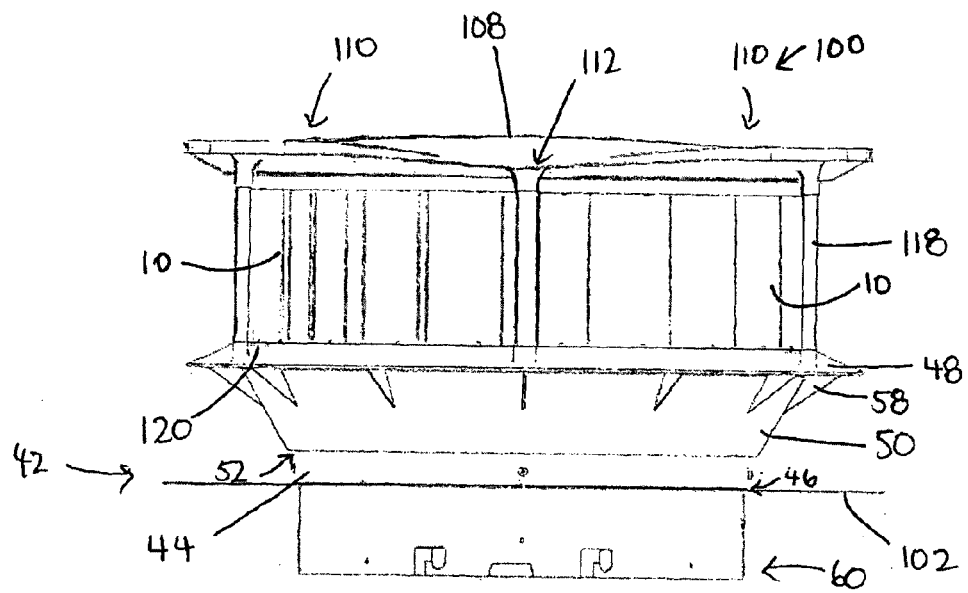
FIG. 4 shows a front view of the ventilator embodiment of FIGS. 2 and 3.
Figure 5:
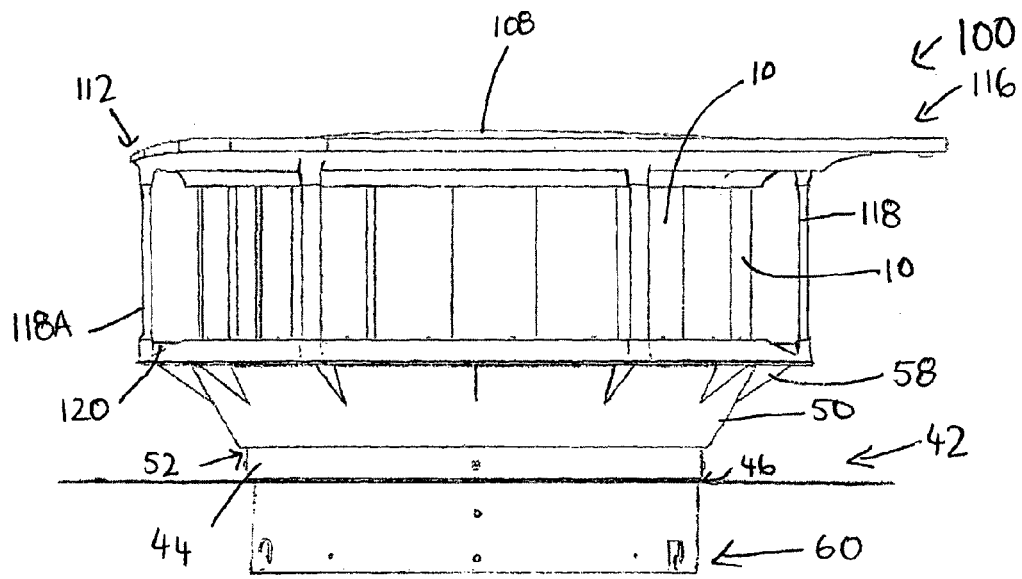
FIG. 5 shows a side view of the ventilator embodiment of FIGS. 2 to 4.

As best shown in FIG. 3, the blades 10 are positioned to substantially overlap with adjacent blades 10 such that, when the ventilator 100 is viewed in a sectional plan view and a line L-L is taken extending between the leading edge 16 and trailing edge 18 of the blade 10, the line L-L is unable to extend uninterruptedly into an interior of the ventilator 100. The line L-L is shown intersecting with the front blade face 14 of an adjacent blade 10. This can prevent particles, such as rain, debris, dust, ambient light, etc, from directly entering the ventilator, as the particles are not able to pass directly through the spacing S between adjacent blades 10. This forces the water to strike one of the faces 12, 14 of the various blades 10, before entering the ventilator 100.

The ventilator 100 is also shown having an asymmetrical cover 106 positioned over the blades 10. The cover 106 provides further protection to the ventilator 100 from environmental conditions/elements. The cover 106 is shown having a central convex portion 108 surrounded by an outer substantially concave portion 110. The cover 106 is also shown having a spout 112, which is formed by parts of the concave portion 110 is converging at a periphery of the cover 106. The spout 112 is formed on the part 114 of the cover 106 which is designed to overlie the blades 10, as opposed to the extended portion 116 of the cover 106 that extends beyond the blades 10 (see FIG. 8), thus making the cover 106 asymmetric.

The spout 112 is designed to be located on the low side of the ventilator 100, and the extended portion 116 is designed to be located on the high side of the ventilator 100 when it is mounted to the roof 200, as shown in FIG. 7. This allows the ventilator to be mounted such that the rotor (i.e. blades 10) is substantially parallel to the roof line. This lowers the profile of the ventilator 100, and also makes the ventilator more efficient as airflow from the wind will follow the roofline and hit the blades 10 more directly than in known ventilators.

The outer concave portion 110 of the cover 106 can act as a trough to direct the flow of water to the spout 112, increasing the velocity of the water to allow it to be propelled off the cover 106, to prevent it leaking into the interior of the ventilator 100.

Ventilator 100 is shown having six mounts, in the form of struts 118, to mount the cover 106 to a peripheral skirt 48 of base 42. The peripheral skirt 48 spaces the struts 118 from the ventilator blades 10, thus allowing the cover 106 to generally overlie the blades 10 and protect them from direct rain. These struts 118 also act as a guide to direct water down the struts 118, away from the blades 10 and the interior of ventilator 100. Strut 118A is substantially aligned with the spout 112, thus guiding any water which has insufficient velocity to be propelled off and away from the cover 106 down the strut 118A, away from the interior of ventilator 100. The peripheral skirt 48 also prevents rain that is reflected from the roof from entering the interior of the ventilator 100.

Base 42 is shown comprising an inner wall 44 and an outer wall 50, from which peripheral skirt 48 extends. Each strut 118 is provided with a web 120 that can direct water down the outer wall 50, and out through an opening 52 in the lower portion of the outer wall 50. The spacing 54 between peripheral skirt 48 and the rotary mount 56 for blades 10 allows water at the strut 118 to be directed down the outer wall 50 and out of opening 52 to the exterior of ventilator 100, to drain down roof 200 to guttering of the house 202.

A number of braces 58 are shown extending between the peripheral skirt 48 and outer wall 50, to provide additional support to the peripheral skirt 48. These braces 58 can also be used as water guides to direct water away from the interior of the ventilator 100.

The base 42 is shown having a lower portion 60 that is adapted to be connected to ducting 204 or a diverter valve 206 (as shown in FIG. 7). Such a valve 206 can be used to direct air from the living space 208 of house 202, or from the roof space 210.

Whilst the ventilator blade was described with reference to its employment in a roof-mounted ventilator, it should be appreciated that the blade may be used in other ventilators. Also, whilst various facets of the ventilator blade were referred to when it was employed in a roof-mounted ventilator, it should be appreciated that this is merely to assist with the understanding of the present disclosure. Further, the blades may take the form of a vane, or another wind drivable element, such as a cup, sail-shape etc.

EXAMPLE

A non-limiting Example of a ventilator incorporating the disclosed ventilator blade will now be described, with reference to the various embodiments as shown in FIGS. 1 to 8.

A rotor ventilator 100 was mounted to the roof 200 of a house 202 such that the rotor (i.e. blades 10 on rotary mount 56) was substantially parallel to the roofline. A lower portion 60 of the base 42 was connected to a diverter valve 206, which was in turn connected to ducting 204. The ducting was connected to a vent in the living space 208 of the house 202. The ventilator 100 had a cover 106 with an asymmetrical portion 116 that extended beyond the rotor on the high side of the roof and a spout 112 on the low side of the roof. The cover 106 also had a central convex portion 108 surrounded by a substantially concave portion 110, with the concave portion converging at a periphery of the cover to form the spout 112.

It was observed that when it rained, the interior of the ventilator 100 remained substantially dry, with little or no rain entering the interior of the ventilator.

Rain that fell on the cover 106 was observed to flow from the convex portion 108 to the concave portion 110, and follow the path of the concave portion to the spout 112 at the low end of the cover. The water was then propelled off the cover 106 via the spout 112. Due to the outer part of the outer concave portion 110, water was unable to spill over the sides and into the interior of the ventilator 100.

Water that was not of a sufficient velocity coming off the spout 112 was guided by strut 118A to drip off of the peripheral skirt 48 onto the roof, or via web 20 to flow through spacing 54 and down the outer wall 50 to exit the ventilator 100 via the opening 52 between the outer wall 50 and the inner wall 44.

Water that struck the roof 200 and bounced back up towards the ventilator 100 was observed to be prevented from entering the interior of the ventilator by the downwardly angled peripheral skirt 48. Any water that struck the skirt 48 remained on the outside of the ventilator 100 and drained away along the roof 200.

Some water that struck the blades 10 was observed to be removed from the blades by the centrifugal forces of the blades spinning. Remnant water on the blades was observed to primarily collect on the back blade faces 14, with minimal accumulation of water on the front blade faces 12. The water on each of the faces was observed to flow towards the leading edge 16. The channels 24, 26 formed between the lips 20, 22 and the back and front blade faces 14, 12, respectively, guided the water down to their ends 32, 34. The water flowed from the ends 32, 34 down inner wall 44 and out of the ventilator via the narrow gap 46 between the flashing 102 and the inner wall 44.

It will be understood to persons skilled in the art that many other modifications may be made without departing from the spirit and scope of the ventilator and ventilator blade as disclosed herein.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the ventilator and ventilator blade.

The invention claimed is:

1. A roof-mounted rotor ventilator comprising a base configured to be mounted on a roof of a building, an interior configured to be connected to a space within the building, and a rotor rotatably supported by the base, the rotor including a plurality of wind-drivable blades, each blade comprising front and back blade faces and leading and trailing edges, wherein, when the ventilator is mounted on the building and viewed in side profile, the blades are positioned and configured such that there is no direct line of sight into the interior of the ventilator, wherein the blades are positioned such that, when the ventilator is viewed in a sectional plan view and a line is taken extending between the leading and trailing edges of each of the blades, the line is unable to extend uninterruptedly into the interior of the ventilator, and wherein the line intersects with the front blade face of an adjacent blade.

2. The ventilator as claimed in claim 1, wherein the blades are positioned such that, when viewed in side profile, each blade substantially overlaps with an adjacent blade.

3. The ventilator as claimed in claim 1, wherein the leading edge comprises a first lip extending along its length on the back blade face.

4. The ventilator as claimed in claim 3, wherein a channel is formed between the first lip and the back blade face.

5. The ventilator as claimed in claim 3, wherein the first lip extends along a portion of an underside edge of the back blade face.

6. The ventilator as claimed in claim 3, wherein the first lip is integrally formed with the blade.

7. The ventilator as claimed in claim 3, wherein the leading edge further comprises a second lip, extending along its length on the front blade face.

8. The ventilator as claimed in claim 7, wherein a channel is formed between the second lip and the front blade face.

9. The ventilator as claimed in claim 7, wherein the second lip extends along a portion of an underside edge of the front blade face.

10. The ventilator as claimed in claim 7, wherein the second lip is narrower than the first lip.

11. The ventilator as claimed in claim 7, wherein the first and second lips extend the same distance along the back and front blade faces, respectively.

12. The ventilator as claimed in claim 7, wherein the second lip is integrally formed with the blade.

13. The ventilator as claimed in claim 7, wherein the first and second lips extend so as to form the leading edge as an aerodynamic edge.

14. The ventilator as claimed in claim 1, wherein the trailing edge comprises an aerodynamic profile at the front blade face.

15. The ventilator as claimed in claim 3, wherein the ventilator comprises an internal drainage line that substantially aligns with a lower end of the first lip.

16. The ventilator as claimed in claim 15, wherein the internal drainage line extends to an external portion of the ventilator.

17. The ventilator as claimed in claim 1, wherein the blades are substantially exposed to wind in use.

18. The ventilator as claimed in claim 1, wherein the ventilator is a wind- or motor-driven ventilator, or a combination thereof.

19. The ventilator as claimed in claim 1, further comprising a cover positioned over the blades.

20. The ventilator as claimed in claim 19, wherein the cover comprises a central portion surrounded by an outer substantially concave portion.

21. The ventilator as claimed in claim 20, wherein the central portion is substantially convex.

22. The ventilator as claimed in claim 20, wherein the cover is asymmetrical such that it extends further beyond the rotor on one side thereof.

23. The ventilator as claimed in claim 20, wherein the cover further comprises a spout.

24. The ventilator as claimed in claim 23, wherein part of the outer substantially concave portion of the cover converges at a periphery of the cover to form the spout.

25. The ventilator as claimed in claim 20, further comprising one or more mounts for mounting the cover to the base of the ventilator.

26. The ventilator as claimed in claim 23 further comprising one or more mounts for mounting the cover to the base of the ventilator, wherein the spout is substantially aligned with one of the mounts.

27. The ventilator as claimed in claim 1, further comprising a peripheral skirt extending around the base of the ventilator.

28. The ventilator as claimed in claim 7, wherein the ventilator comprises an internal drainage line that substantially aligns with a lower end of the second lip.

29. The ventilator as claimed in claim 1, wherein the ventilator interior is connected to the space within the building via a valve.

30. The ventilator as claimed in claim 1, wherein the ventilator interior is connected to the space within the building via ducting.

31. A roof-mounted rotor ventilator comprising:
a base mounted on a roof of a building;
an interior connected to a space within the building; and
a rotor rotatably supported by the base, the rotor including a plurality of wind-drivable blades, each blade comprising front and back blade faces and leading and trailing edges, wherein, when the ventilator is viewed in side profile, the blades are positioned and configured such that there is no direct line of sight into the interior of the ventilator, wherein the blades are positioned such that, when the ventilator is viewed in a sectional plan view and a line is taken extending between the leading and trailing edges of each of the blades, the line is unable to extend uninterruptedly into the interior of the ventilator, and wherein the line intersects with the front blade face of an adjacent blade.

32. A method of ventilating a building, the method comprising:
providing a rotor ventilator comprising a base configured to be mounted on a roof of the building, an interior configured to be connected to a space within the building, and a rotor rotatably supported by the base, the rotor including a plurality of wind-drivable blades, each blade comprising front and back blade faces and leading and trailing edges;
mounting the rotor ventilator on the building such that the base is mounted on the roof of the building, the interior is connected to the space within the building, and, when the ventilator is viewed in side profile, the blades are positioned and configured such that there is no direct line of sight into the interior of the ventilator, wherein the blades are positioned such that, when the ventilator is viewed in a sectional plan view and a line is taken extending between the leading and trailing edges of each of the blades, the line is unable to extend uninterruptedly into the interior of the ventilator, and wherein the line intersects with the front blade face of an adjacent blade.

* * * * *